3,023,250
PREPARATION OF UNSATURATED ETHERS
Amelio E. Montagna and Donald H. Hirsh, South Charleston, W. Va., assignors to Union Carbide Corporation, a corporation of New York
No Drawing. Filed Apr. 10, 1957, Ser. No. 651,812
7 Claims. (Cl. 260—614)

This invention relates to the production of unsaturated organic ethers. In one aspect this invention relates to a method of preparing 1-alkenyl 2-haloalkyl ethers by the dealcoholation of the corresponding 1,1-di(2-haloalkoxy) alkanes.

Various methods for the production of a 1-alkenyl 2-haloalkyl ether are known. For example, vinyl 2-chloroethyl ether can be produced by the low temperature reaction between vinyl acetate and ethylene chlorohydrin; by the liquid phase dehydrohalogenation of 2,2'-dichlorotheyl ether with solid sodium hydroxide; by the vapor phase pyrolysis of di(2-chloroethyl) acetal, and so forth.

However, these methods suffer from certain serious disadvantages. The low temperature reaction between vinylacetate and ethylene chlorohydrin gives low conversions to the desired product. Dehydrohalogenation of 2,2'-dichloroethyl ether gives rise to a variety of products resulting in low yields and entailing considerable difficulty in separating vinyl 2-chloroethyl ether in high purity. The vapor phase pyrolysis of di(2-chloroethyl) acetal introduces difficulty in keeping the desired product from polymerizing and engaging in other reactions and thus results in low yields.

It has also been proposed to prepare ethyl vinyl ether by the vapor phase dissociation of diethyl acetal in the presence of the vapor of a strong mineral acid and a nitrogen-containing base. The highest percent conversion reported was 67 percent. As will be apparent from the practice of the instant invention, yields as high as 90 percent, and higher, are obtained by the dealcoholation of halogenated acetals to produce halogenated unsaturated ethers and halogenated coproducts, notwithstanding the fact that said halogenated acetal and halogenated coproducts possess a stronger tendency to enter into undesirable side reactions such as polymerization, condensation, etc., than is the case with the corresponding non-halogenated compounds.

As is well recognized, alpha, beta-unsaturated ethers are unstable in the presence of even minute amounts of strong acids or other substances having acidic properties. Acidic substances can cause hydrolysis of the alpha, beta-unsaturated ether in the presence of water, alcoholation in the presence of aliphatic alcohols, and polymerization in the absence of excess water or aliphatic alcohols. Thus, a definite problem is encountered in the liquid-phase dealcoholation of acetals in the presence of a strong acid catalyst to produce the corresponding alpha, beta-unsaturated ether and alcohol. Consequently, it has been proposed to remove the products, i.e., alpha, beta-unsaturated ether and alcohol, by distillation or other known means from the acidic reaction mixture virtually as rapidly as they are formed during the liquid-phase dealcoholation process. However, in addition to entrained acid catalyst which can carry over with the products, i.e., alpha, beta-unsaturated ether and alcohol, during the products recovery step, acidic substances can also be present, inadvertently, due to contamination of the still column from prior use, or by employing a still packing which is inherently acidic.

Therefore, to obtain optimum yields by minimizing side reactions, it is important to prevent the presence of acidic substances at all points in the system, except in the still kettle where the dealcoholation reaction takes place.

When employing 1,1-di(2-haloalkoxy)alkane wherein the alkane substituent contains at least two carbon atoms as the reagent in the dealcoholation process, the prevention of acidic substances in the system becomes exceedingly more difficult. These halogenated acetals themselves undergo dehydrohalogenation, or upon dealcoholation, said acetals yield the corresponding 1-alkenyl 2-haloalkyl ethers and 2-haloalkyl alcohols, either or both of which can undergo dehydrohalogenation, i.e., split off hydrogen halide. A further complication is that most of the more common metal materials of construction for industrial equipment e.g., steel, stainless steel and copper, accelerate the rate of dehydrohalogenation and aggravate the problem. For example, 1,1-di-(2-chloroethoxy)ethane can be dealcoholated to yield vinyl 2-chloroethyl ether and ethylene chlorohydrin, the alcohol coproduct of the dealcoholation reaction. Ethylene chlorohydrin is relatively unstable and releases hydrogen chloride which can cause undesired polymerization of the vinyl 2-chloroethyl ether and/or recombination of the said ether with the ethylene chlorohydrin in the still column.

We have found that 1-alkenyl 2-haloalkyl ethers can be prepared in high yields by way of the liquid phase dealcoholation of the corresponding 1,1-di(2-haloalkoxy)-alkanes in the presence of an acid catalyst. The coproducts of the reaction, i.e., 1-alkenyl 2-haloalkyl ether and 2-haloalkyl alcohol, are virtually removed as fast as they are formed in the still kettle while injecting into the still column a nitrogen-containing base, e.g. an amine compound, whose boiling point is below the boiling point of the acetal and between about 10° C. higher and about 100° C. lower than the boiling point of the lower boiling dealcoholation coproduct or any azeotrope which may be formed. By our process 1-alkenyl 2-haloalkyl ether can be obtained in yields as high as 90 percent and higher at efficiencies as high as 98 percent.

Accordingly, one or more of the following objects will be achieved by the practice of our invention.

It is an object of this invention to provide a novel process for preparing 1-alkenyl 2-haloalkyl ethers. It is also an object of this invention to conduct a novel liquid-phase deacoholation reaction wherein undesirable polymerization and side reactions are minimized. It is a further object of this invention to recover 1-alkenyl 2-haloalkyl ether in substantially monomeric form as a product from the acid-catalyzed dealcoholation of the corresponding 1,1-di(2-haloalkoxy) alkane. It is likewise an object of this invention to conduct a novel liquid-phase, acid-catalyzed dealcoholation reaction wherein an alpha, beta-unsaturated halogenated ether is recovered, by distillation, from the dealcoholation reaction mixture while continuously injecting a nitrogen-containing base such as an amine compound into the still column.

Numerous other objects of the present invention will become apparent to those skilled in the art from a consideration of the instant specification.

The preparation of 1,1-di(2-haloalkoxy)alkane by the reaction of 2-haloalkanol and a saturated aliphatic aldehyde is illustrated by the following chemical equation:

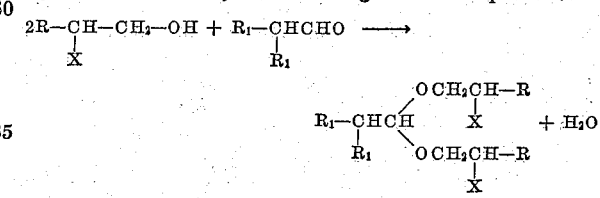

wherein each R and $R_1$ can individually be hydrogen or an alkyl radical and X is a halogen such as chlorine and bromine.

The dealcoholation of 1,1-di(2-haloalkoxy)alkane to form 1-alkenyl 2-haloalkyl ether and alkylene halohydrin can be illustrated by the equation:

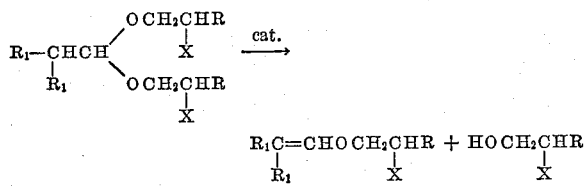

$$R_1C=CHOCH_2CHR + HOCH_2CHR$$
$$\quad\ |\qquad\qquad |\qquad\qquad\quad |$$
$$\ R_1\qquad\qquad X\qquad\qquad\quad X$$

From the equations illustrating the formation and decomposition of acetal, it may be seen that the starting material, alkylene halohydrin, appears as one of the products in the reaction by which 1-alkenyl 2-haloalkyl ether is prepared. The advantage of such a series of reactions is obvious, particularly since the alkylene halohydrin can be recovered without difficulty.

Broadly speaking, our method for the production of 1-alkenyl 2-haloalkyl ether comprises heating the corresponding 1,1,-di(2-haloalkoxy)alkane in the presence of an acid catalyst, to a temperature sufficient to vaporize the alpha, beta-unsaturated halogenated ether and halogenated alcohol coproducts, injecting into the still column a relatively low boiling nitrogen-containing base, e.g., an amine compound, whose boiling point at the operating conditions of the process is between about 10° C. higher and about 100° C. lower than the boiling point of the lower boiling dealcoholation product, i.e., ether or alcohol, or of any azeotrope which may be formed, and collecting the above said coproducts as distillate.

The 1,1-di(2-haloalkoxy) alkanes wherein the alkane substituent preferably contains between 2 and 12 carbon atoms which are contemplated as the starting material in this process include, among others, 1,1-di(2-chloroethoxy)ethane, 1,1-di(2-bromoethoxy)ethane, 1,1-di(2-chloropropoxy)ethane, 1,1-di(2-bromobutoxy)ethane, 1,1-di(2-chloroethoxy)propane, 1,1-di(2-bromopropoxy)propane, 1,1-di(2-chloroethoxy)butane, 1,1-di(2-bromobutoxy)-3-methylbutane, 1,1-di(2-chloroethoxy)hexane, 1,1-di(2-bromoethoxy)hexane, 1,1-di(2-chloropropoxy)-4-methylhexane, 1,1,-di(2-chlorobutoxy)octane, 1,1-di(2-chloroethoxy)-2-methylpentane, 1,1-di(2-chloroethoxy)-2-ethylhexane, 1,1-di(2-bromoethoxy)octane, and the like. It is further preferred to employ those 1,1-di(2-haloalkoxy)alkanes wherein the alkane substituent contains from 2 to 8 carbon atoms, and wherein the 2-haloalkoxy substituent contains from 2 to 3 carbon atoms; the halogen substituent preferably is chlorine.

The catalysts suitable for the dealcoholation reaction are the strong mineral and aromatic sulfonic acids which are substantially non-volatile at the reaction temperature and pressure. Exemplary catalysts include the mineral acids such as sulfuric acid and phosphoric acid; the aromatic sulfonic acids such as benzenesulfonic acid, p-toluenesulfonic acid and the like; the naphthalenesulfonic acids; and others. The mineral acids are preferred with phosphoric acid being particularly satisfactory.

The catalyst is employed in catalytic quantities, and, in general, a catalyst concentration in the range from about 0.001 to about 5.0 percent by weight based on the weight of the acetal being decomposed is suitable. A catalyst concentration range from about 0.05 to about 1.0 percent by weight is preferred. Fresh catalyst can be added to the dealcoholation reaction mixture in order to maintain the reaction rate. As a practical matter the concentration of the catalyst will be determined by rate of dealcoholation desired.

The optimum operating conditions of the process of the instant invention depend on several considerations such as the ether being produced, rate of decomposition of the acetal, vapor pressures of the acetal and final products, the particular catalyst employed, and other factors.

In general, the operable temperature range is from about 50° C. to about 225° C., preferably from about 100° C. to about 175° C. It is preferable to employ a reaction temperature close to the boiling point of the acetal at the reaction pressure in order to rapidly remove the ether formed during the dealcoholation process, e.g., by distillation. A pressure in the range from about 1 mm. to about 760 mm. of Hg is suitable in our process; a pressure range from about 1 mm. to about 200 mm. is preferred, depending on the particular halogenated acetal used in the process. It is to be understood that in operating within the above ranges, the temperature and pressure are so chosen as to volatilize the products, i.e., ether and alcohol, while maintaining the acetal in substantially a liquid phase.

As stated previously, it is desirable to conduct the dealcoholation process under reaction conditions of temperature and pressure sufficient to vaporize the coproducts, i.e., 1-alkenyl 2-haloalkyl ether and 2-haloalkyl alcohol, which coproducts are preferably removed virtually as fast as they are formed from the reaction vessel. For this purpose, a suitable apparatus is a reaction vessel attached to a fractionating distillation column. It is desirable to effect some rectification of the vapors from the reaction vessel since considerable quantities of acetal may appear in the vapors. In accordance with the process of our invention a nitrogen-containing base such as an amine compound, described hereinafter, is injected or introduced into the column to prevent the undesirable competing reactions described previously. Of course, the optimum point of feed of, for example, the amine into the column depends upon the dimensions and type of construction of the column, the boiling point of the amine in relation to the boiling points of the products, that is, the ether and alcohol produced during the dealcoholation reaction, and other factors. In general, the point of introduction of the amine into the column is so selected so that a minimum amount of the free amine reaches the reaction vessel while at the same time free amine is present throughout the column. Any amine hydrohalide that is formed in the column by the reaction of the amine and hydrogen halide will reach the reaction vessel; however, the amine hydrohalide does not deactivate the acid dealcoholation catalyst. On the other hand, excessive quantities of free amine in the reaction vessel neutralizes and thus deactivates the acid catalyst.

Consequently, if the amine chosen to neutralize any acidic substances such as the acidic nature of the distillation column, entrained acid catalyst and/or hydrogen halide present in the system, excluding the reaction vessel, possesses a boiling point which is quite near the lower boiling point of either the ether or alcohol coproducts, satisfactory results are achieved by preferably introducing the amine into the lower half of the column, e.g., at a point which is from about one-quarter to about one-half the distance of the column measured from the reaction vessel or still kettle. An amine whose boiling point is appreciably lower than either the ether or alcohol coproducts or any azeotrope thereof can be introduced at the base of the column or at a point between the base and the lower quarter of the column. The addition of a relatively high-boiling amine or other essentially non-volatile alkaline material to top of the column, for example, as reflux, is not practical because the alkaline material after passing down the column would enter into the reaction vessel and deactivate the acid catalyst by reacting, i.e., neutralizing, with above-said catalyst. On the other hand a relatively volatile alkaline material added to the top of the column would substantially vaporize at that point and thus, the alkaline material would not be available throughout the entire length of the column.

The amine is preferably added continuously throughout the dealcoholation reaction, and, in general, the amount added is sufficient to neutralize all acidic substances present in the column. It is preferred to add an excess of the amine sufficient to neutralize the acidic substances in the column and in the receiver. A convenient method of ensuring that and excess of amine is being added is to add an amount which will result in the presence of free amine at all times, in the ether and alcohol condensate collected in the receiver. A test or pH control on the condensate will serve to inform the operator of the alkalinity or acidity of the condensate. The amount of excess amine to be used can be as little as about 0.01 percent by weight of the distillate or as high as desired. Generally, there is no advantage to using a very large excess of amine. Concentrations of amine ranging from about 0.1 to about 1.0 percent by weight in the distillate are preferred.

The amine can be added alone or as a solution of any practical concentration in the acetal being dealcoholated, or in the 1-alkenyl 2-haloalkyl ether, or in the 2-haloalkyl alcohol, or in any mixture of these or in an inert solvent such as hydrocarbons, chlorinated hydrocarbons, aliphatic ethers, and the like. The use of such a solution is advantageous if the amount of amine to be added is very small since better control of the rate of the addition results.

In general, satisfactory results are achieved with an amine whose boiling point at the dealcoholation reaction conditions of pressure and temperature is between about 10° C. above and 100° C., or more, below the boiling point of the lower boiling dealcoholation product or of any azeotrope which may form. An amine whose boiling point under the reaction conditions is from about 10° C. to about 50° C. lower than the lowest boiling dealcoholation product or azeotrope is preferred.

The amines contemplated by the process of this invention include, among others, alkyl amines, cycloalkyl amines, alkyl substituted cycloalkyl amines, piperidines and pyridines. Primary, secondary, and tertiary amines can be used with approximately equal satisfactory results. Trialkyl-substituted tertiary amines are particularly desirable in the dealcoholation of 1,1-di(2-haloethoxy)alkanes such as 1,1-di(2-chloroethoxy)alkane wherein the alkane substituent contains at least two carbon atoms. Exemplary amines for the dealcoholation of 1,1-di(2-chloroethoxy)ethane include trimethylamine, triethylamine, N,N-dimethylethylamine, N,N-diethylmethylamine, N-methyl-N-ethylpropylamine, N,N-dimethypropylamine, N,N-dimethylbutylamine; pyridine and alkyl-substituted pyridines such as the picolines, piperidine, N-methylpiperidine and the like. A particularly suitable class of trialkyl-substituted amines are those wherein the alkyl groups contain from 1 to 4 carbon atoms, and the sum of the carbon atoms in the alkyl groups is not greater than 8. With cyclic amines desirable results are obtained when the total carbon content does not exceed 8.

The equipment employed in the following examples comprised a one-liter kettle equipped with a thermowell (kettle temperature), and means for adding 1,1-di(2-chloroethoxy)ethane and/or catalyst mixture. The kettle was heated by a Glas-Col mantle. Attached to the kettle was a 41 mm. O.D. by 1220 mm. glass column wrapped with magnesia insulation and equipped with two thermowells located at 610 mm. (center column temperature) and 810 mm. (top column temperature) from the bottom. The column was equipped for adding triethylamine into the column at a point 410 mm. from the bottom. The column was packed with various materials as described in the following examples. The top of the column was equipped with a total condensing still head having a thermometer (vapor temperature) and means for removing condensed product and returning part of the condensate to the top of the column.

Except where indicated otherwise, the procedure used in the following examples was as follows:

Approximately 500 grams of 1,1-di(2-chloroethoxy)-ethane was charged to the kettle of the cracking still. The pressure at the head of the still was reduced to 100 mm. of Hg and the acetal was heated to boiling (approximately 150° C.). When the vapors of the acetal reached the top of the column, the addition of triethylamine, either alone or as a solution in 1,1-di(2-chloroethoxy)-ethane to the column at the point designated above, was started. The triethylamine was added continuously throughout the operation and the rate of addition was held approximately constant. A few minutes after the feeding of triethylamine has been started, the addition of a catalyst solution into the boiling kettle liquid was begun. The catalyst solution was composed of phosphoric acid in 1,1-di(2-chloroethoxy)ethane. The catalyst solution was added continuously, except when, as indicated in the individual examples, the feeding of the catalyst solution was discontinued at various times, and in its place was substituted 1,1-di(2-chloroethoxy)ethane containing no phosphoric acid, and this material was also added continuously. The rate of addition of either the catalyst solution or the acetal alone was regulated to maintain a constant volume of approximately 500 ml. of liquid in the kettle.

Dealcoholation of the acetal started as soon as the feeding of catalyst solution was commenced and the rate of dealcoholation increased gradually as the concentration of catalyst in the kettle liquid increased. In general, the catalyst solution was added until the desired rate of reaction was attained, at which point the acetal alone was substituted as the feed material. The feeding of catalyst solution was resumed later in the operation whenever the rate of dealcoholation had decreased significantly. The products of the dealcoholation, vinyl 2-chloroethyl ether and ethylene chlorohydrin, were vaporized virtually as rapidly as formed and were condensed and removed continuously as the distillate from the top of the column.

The pressure at the head of the still was maintained at approximately 100 mm. of Hg. The rate of removal of distillate, the rate of reflux, and the heat input to the kettle were regulated to maintain temperatures in the still approximately at the following levels: vapor temperature, 60–65° C.; top column temperature, 90–110° C.; center column temperature, 140–150° C.; and kettle temperature, 150–160° C.

The continuous operation was terminated as described in the individual examples.

*Example 1*

The still column was packed with 8 by 8 mm. glass Raschig rings. The triethylamine was added undiluted into the column at the average rate of about 2 grams per hour. The catalyst solution was composed of 0.2 percent by weight of phosphoric acid in 1,1-di(2-chloroethoxy)ethane. This catalyst solution was fed continuously into the kettle for a period of 3.5 hours, at which time a total of 776 grams of 1,1-di(2-chloroethoxy)-ethane admixed with 1.5 grams of phosphoric acid, had been added, and the concentration of phosphoric acid in the kettle liquid was about 0.3 percent by weight.

After the 3.5 hours of continuous operation as described above, the feeding of the catalyst solution was discontinued, and the dealcoholation was continued without adding any more acetal. Thus, the liquid in the kettle became gradually exhausted.

The distillate collected during the entire operation amounted to 1274 grams and contained 48.3 percent of vinyl 2-chloroethyl ether and 11.5 percent of 1,1-di(2-chloroethoxy)ethane, the remainder being ethylene chlorohydrin and triethylamine. The yield of vinyl 2-chloroethyl ether was 85 percent and the efficiency to vinyl 2-chloroethyl ether was 96 percent, based on the total 1276 grams of acetal used.

The crude product was distilled to obtain a fraction containing 91 percent by weight of vinyl 2-chloroethyl ether, 0.6 percent by weight of triethylamine, and 8 percent by weight of ethylene chlorohydrin. A refined product containing 97 percent by weight vinyl 2-chloroethyl ether was obtained by reacting the contained triethylamine with carbon dioxide and removing the ethylene chlorohydrin and the amine carbonate by washing with water. The washed ether was dried by distillation. Acetic acid was also used for neutralizing the triethylamine with equally satisfactory results.

*Example II*

In this experiment, the procedure and equipment were the same as described in Example I, except that no amine was added to the column, but instead a high boiling amine, triethanolamine, was added to the recovered distillate. Upon termination of the experiment the distillate was found to contain ethylene chlorohydrin and 1,1-di-(2-chloroethoxy)ethane; practically no vinyl 2-chloroethyl ether was obtained. The liquid in the kettle contained polymer.

It appears that in the absence of amine in the column, under conditions otherwise identical to those of Example I, the undue contact period of the vinyl 2-chloroethyl ether product in the acidic environment of the column prevented recovery of said vinyl 2-chloroethyl ether.

*Example III*

Among the better methods suggested to produce 1-alkenyl 2-chloroethyl ether such as vinyl 2-chloroethyl ether involves the technique wherein there is a compromise among such factors as minimum contact time of the products (ether and alcohol) in the reaction vessel, sufficient rectification of the vapors in the fractionation column, and minimum liquid phase contact time between ethylene chlorohydrin and vinyl 2-chloroethyl ether before basic neutralization of these products, i.e., distillate, in the receiver. In this experiment no amine compound was added to the column, but rather, the amine was introduced into the distillate.

The reaction equipment consisted of a one-liter three-necked flash fitted with an addition funnel and a thermometer well and attached to a 25 by 550 mm. fractionation column packed with 6 mm. glass rings, and surmounted by a goose-neck type vapor line. The vapor line was attached to a brine-cooled condenser which led to a double-bulb vacuum receiver fitted with a motor-driven stirrer and an addition funnel.

Into the one-liter flask was placed 100 grams of Dowtherm A and 0.1 ml. of 85 percent phosphoric acid, the pressure on the system was reduced to 100 mm. of Hg absolute pressure, and the Dowtherm A was heated to 150° C. To the reaction kettle there was charged 1,1-di(2-chloroethoxy)ethane at such a rate to maintain a constant level, and crude reaction product was removed via the vapor line at a temperature range from about 64° C. to 85° C. A total of 2,698 grams of acetal was introduced over a period of nine hours, and a total of 50 grams of triethanolamine was added, in increments, to the crude product in the receiver throughout the course of the experiment. A total of 0.5 ml. of additional phosphoric acid was introduced into the reaction flask, in 0.1 ml. portions, at intervals when the rate of dealcoholation had apparently diminished. Fractional distillation of the crude product gave vinyl 2-chloroethyl ether in a yield of 75 percent of theory at an efficiency of 91 percent, based on the acetal, i.e., 1,1-di(2-chloroethoxy)ethane.

Thus, it is readily apparent that a comparison of Examples I and III reveal that greater yields at greater efficiencies are obtained by practicing our invention, i.e., introducing an amine compound into the column during the dealcoholation reaction, than is the case when an amine compound is introduced only into the distillate.

*Example IV*

The equipment employed in the following example is the same as that employed in Example I except the column of the still was packed with 0.16 by 0.16 inch type 316 stainless steel protruded still packing. The triethylamine was used as a 10 percent by weight solution in 1,1-di(2-chloroethoxy)ethane and this solution was added into the column at the rate of about 12 ml. per hour. The catalyst solution of 0.2 percent by weight of phosphoric acid in 1,1-di(2-chloroethoxy)ethane was added into the kettle until the concentration of phosphoric acid in the kettle liquid amounted to 0.1 percent by weight. At this point, 1,1-di(2-chloroethoxy)ethane containing no catalyst was substituted as the feed. During the subsequent operation, the catalyst solution and the acetal containing no catalyst were fed alternately. At the end of 6.6 hours of continuous operation the total amount of phosphoric acid added to the kettle liquid was equal to 2.5 grams, or approximately 0.5 percent by weight of the kettle liquid. The total amount of acetal added during the 6.6 hours of continuous operation was 1204 grams; this amount included the acetal added alone, that added as catalyst solution, and that added as triethylamine solution.

After the 6.6 hours of continuous operation as described above, the feeding of acetal or catalyst was discontinued, and the dealcoholation was continued until the volume of liquid in the kettle had been reduced to about 100 ml. At this point, heating of the kettle was stopped. The phosphoric acid in the liquid residue was neutralized by adding 14 grams of sodium bicarbonate. The kettle containing the neutralized residue was transferred to a smaller still and the mixture was distilled to recover the unconverted acetal and the ethylene chlorohydrin and vinyl 2-chloroethyl ether that had drained back to the kettle from the column of the cracking still.

The distillate collected from the cracking still amounted to 1503 grams and contained 53.9 percent of vinyl 2-chloroethyl ether and 7.2 percent of 1,1-di(2-chloroethoxy)ethane. The material recovered from the distillation of the neutralized residue amounted to 110 grams and contained 72.2 percent by weight of 1,1-di(2-chloroethoxy)ethane and 9.4 percent by weight of vinyl 2-chloroethyl ether. The overall yield of vinyl 2-chloroethyl ether was 85 percent and the efficiency to vinyl 2-chloroethyl ether was 95 percent, based on the total 1704 grams of acetal used.

*Example V*

In another experiment similarly carried out as described in Example IV, but without the addition of triethylamine into the still column, little or no vinyl 2-chloroethyl ether was produced. Triethanolamine was added to the distillate in this experiment to neutralize same.

*Example VI*

In the following example the equiment used was the same as described for Example I except that the column of the still was packed with one-quarter inch Karbate No. 21 Raschig rings. The triethylamine was used as a 10 percent by weight solution in 1,1-di(2-chloroethoxy)ethane and this solution was added into the column at the rate of about 11 ml. per hour. The catalyst solution of 0.4 percent by weight of phosphoric acid in 1,1-di(2-chloroethoxy)ethane was added into the kettle until the concentration of phosphoric acid in the kettle liquid was about 0.1 percent by weight. At this point, 1,1-di(2-chloroethoxy)ethane containing no catalyst was substituted as the feed. During the subsequent continuous operation, the two feed materials were used alternately. At the end of 6.3 hours of operation, an additional 0.1 percent by weight of phosphoric acid had been added to the kettle liquid, and the total amount added was 0.2 percent by weight of the kettle liquid. The total amount of 1,1-di(2-chloroethoxy)ethane added during the 6.3 hours of continuous operation was 1632 grams, which includes the acetal added alone and that in the triethylamine and catalyst solutions.

After the 6.3 hours of continuous operation, the feeding of acetal was discontinued and the dealcoholation was continued until the liquid in the kettle was almost completely exhausted.

The distillate was collected in two portions. The first portion amounted to 1775 grams and contained 54.1 percent of vinyl 2-chloroethyl ether and 5.5 percent of 1,1-di(2-chloroethoxy)ethane. The second portion weighed 362 grams and contained 24.5 percent of vinyl 2-chloroethyl ether and 47.3 percent of 1,1-di(2-chloroethoxy)-ethane. The overall yield of vinyl 2-chloroethyl ether was 85 percent and the efficiency to vinyl 2-chloroethyl ether was 98 percent, based on the total 2132 grams of acetal used.

The charge of 1,1-di(2-chloroethoxy)ethane charged to the reaction vessel was an initial charge of 500 grams plus an additional 1632 grams (over a 6.3 hour period) or a total charge of 2132 grams of acetal. The residue (acetal or equivalent remaining after 6.3 hours) amounted to 385 grams (summation of materials collected as follows: distillate, 362 grams; distillate, 19 grams; traps material 3 grams; residue, 1 gram); consequently the net acetal feed was 1747 grams. During the 6.3 hour period of continuous operation, 1775 grams of distillate containing 54.1 percent by weight of vinyl 2-chloroethyl ether was obtained. The "instantaneous yield" over the continuous period at equilibrium conditions is determined by the following formula:

Instantaneous yield $$= \frac{\text{Mols vinyl 2-chloroethyl ether obtained} \times 100}{\text{Mols 1, 1-di (2-chloroethoxy) ethane reacted}}$$

The "instantaneous yield" can be defined as the yield obtained by continuous operation during a finite time while the system was at equilibrium. The "instantaneous yield" of vinyl 2-chloroethyl ether was 95.4 percent.

*Example VII*

The same equipment was used in the following example as described for Example I except that the column of the still was packed with copper sponge. The triethylamine was used as a 10 percent by weight solution in 1,1-di(2-chloroethoxy)ethane and this solution was fed at the rate of about 12 ml. per hour. The catalyst solution of 0.4 percent by weight of phosphoric acid in 1,1-di(2-chloroethoxy)ethane was added into the kettle until the concentration of phosphoric acid in the kettle liquid was about 0.1 percent by weight. At this point, 1,1-di(2-chloroethoxy)ethane containing no catalyst was substituted as the feed and this feed was continued for the duration of the continuous operation which lasted a total of 5.5 hours. The total amount of 1,1-di(2-chloroethoxy)-ethane added during the 5.5 hours of continuous operation was 1494 grams, including that added alone and that added in the catalyst and triethylamine solutions.

After the 5.5 hours of continuous operation, the feeding of acetal was discontinued and the dealcoholation was continued until the liquid in the kettle was almost completely exhausted.

The distillate was collected in two portions. The first portion weighed 1741 grams and contained 54.8 percent by weight of vinyl 2-chloroethyl ether and 1.0 percent by weight of 1,1-di(2-chloroethoxy)ethane. The second portion weighed 235 grams and contained 15.7 percent by weight of vinyl 2-chloroethyl ether and 50.0 percent by weight of 1,1-di(2-chloroethoxy)ethane. The overall yield of vinyl 2-chloroethyl ether was 87 percent and the efficiency to vinyl 2-chloroethyl ether was 94 percent, based on the total 1994 grams of acetal used.

The charge of 1,1-di(2-chloroethoxy)ethane charged to the reaction vessel was an initial charge of 500 grams plus an additional 1494 grams (over a 5.5 hour period) or a total charge of 1994 grams of acetal. The residue (acetal or equivalent remaining after 5.5 hours) amounted to 251 grams (summation of materials collected as follows: distillate, 235 grams; traps, 14 grams; residue, 14 grams); consequently the net acetal feed was 1743 grams. During the 5.5 hours period of continuous operation, 1741 grams of distillate containing 54.8 percent by weight of vinyl 2-chloroethyl ether was obtained. The "instantaneous yield" of vinyl 2-chloroethyl ether was 96.0 percent.

Although the invention has been illustrated by the preceding examples, the invention is not to be regarded as limited to the materials used in the above-said exemplary examples, but rather, the invention encompasses the generic concept as hereinbefore disclosed. Various modifications and embodiments of our invention can be made without departing from the spirit and scope thereof.

What is claimed is:

1. In the process for preparing 1-alkenyl 2-haloalkyl ether which comprises heating the corresponding 1,1-di(2-haloalkoxy)alkane in the liquid phase, in the presence of an acid catalyst, to a temperature sufficient to produce a vaporous mixture comprising 1-alkenyl 2-haloalkyl ether and 2-haloalkyl alcohol coproducts, and collecting said coproducts as distillate, the improvement which comprises injecting into the distillation zone an organic nitrogen-containing base whose boiling point under the reaction conditions is between about 10° C. above and 100° C. below the boiling point of the lowest boiling component comprising said vaporous mixture.

2. In the process for preparing 1-alkenyl 2-haloalkyl ether which comprises heating the corresponding 1,1-di(2-haloalkoxy)alkane in the liquid phase, in the presence of an acid catalyst, to a temperature sufficient to produce a vaporous mixture comprising: (*a*) 1-alkenyl 2-haloalkyl ether, (*b*) 2-haloalkyl alcohol, and (*c*) an azeotropic mixture thereof, and collecting said vaporous mixture as distillate, the improvement which comprises injecting into the distillation zone an organic amine whose boiling point under the reaction conditions is between about 10° C. above and 100° C. below the boiling point of the lowest boiling substance designated as *a*, *b* and *c* above.

3. In the distillation of a vaporous mixture comprising 1-alkenyl 2-haloalkyl ether, 2-haloalkyl alcohol, and azeotropic mixtures thereof, said vaporous mixture produced by heating the corresponding 1,1-di(2-haloalkoxy)-alkane in the liquid phase under reduced pressure and in the presence of an acidic catalyst, to a temperature sufficient to vaporize 1-alkenyl 2-haloalkyl ether and 2-haloalkyl alcohol coproducts, the improvement which comprises continuously injecting into the distillation zone an organic nitrogen-containing base in a quantity at least sufficient to neutralize said vaporous mixture comprising 1-alkenyl 2-haloalkyl ether and 2-haloalkyl alcohol and azeotropic mixtures thereof, said organic nitrogen-containing base having a boiling point under the reaction conditions between about 10° C. above and 100° C. below the boiling point of the lowest boiling component comprising the said vaporous mixtures.

4. The process of claim 3 wherein said organic nitrogen-containing base is a trialkyl-substituted tertiary amine which has a boiling point under the reaction conditions between about 10° C. to about 50° C. below the boiling point of the lowest boiling component comprising the said vaporous mixture.

5. In a process for distilling a vaporous mixture in a distillation zone which comprises reacting 1,1-di(2-haloalkoxy)alkane wherein said alkane substituent contains from 2 to 12 carbon atoms, in a reaction zone communicating with said distillation zone, in the liquid phase, in the presence of a catalytic amount of a strong acid catalyst which is substantially non-volatile under the reaction conditions, at a pressure in the range from about 1 mm. to about 760 mm. of Hg, at a temperature sufficient to vaporize the coproducts of the reaction, said temperature being maintained in the range of from about 50° C. to 225° C., and collecting said coproducts as distillate, the improvement which comprises continuously injecting into the lower portion of said distillation zone a trialkyl-substituted tertiary amine in a quantity at least sufficient to neutralize the vaporous coproducts, said amine having a boiling point under the reaction conditions between about 10° C. above and 100° C. below the boiling point of the lower boiling coproduct.

6. The method for preparing vinyl 2-chloroethyl ether which comprises reacting 1,1-di(2-chloroethoxy)-ethane, in the liquid phase, in the presence of a catalytic amount of phosphoric acid, at a temperature sufficient to vaporize vinyl 2-chloroethyl ether and 2-chloroethyl alcohol coproducts, distilling the vaporous mixture comprising said vaporized coproducts while continuously injecting a trialkyl-substituted tertiary amine into the lower portion of the distillation zone in an amount at least sufficient to neutralize said vaporous mixture, said amine having a boiling point under the reaction conditions between about 10° C. above and about 100° C. below the boiling point of the lowest boiling component comprising said vaporous mixture, and collecting said vaporous mixture as distillate.

7. The process of claim 6 wherein said amine is triethylamine.

References Cited in the file of this patent
UNITED STATES PATENTS

| | | |
|---|---|---|
| 2,482,725 | Bramwyche et al. | Sept. 20, 1949 |
| 2,667,517 | Longley | Jan. 26, 1954 |
| 2,683,125 | D'Alelio | July 6, 1954 |

OTHER REFERENCES

Street et al.: Jour. Amer. Chem. Soc., vol. 50 (1928), page 165 (1 page).

Voronkov: Chem. Abstracts, vol. 45 (1951), column 5607 (1 page).